March 15, 1927.  
C. O. WEBER  
1,621,145  
FEEDING DEVICE FOR GRINDING, MILLING, OR BORING MACHINES AND THE LIKE  
Filed March 11, 1925  2 Sheets-Sheet 1
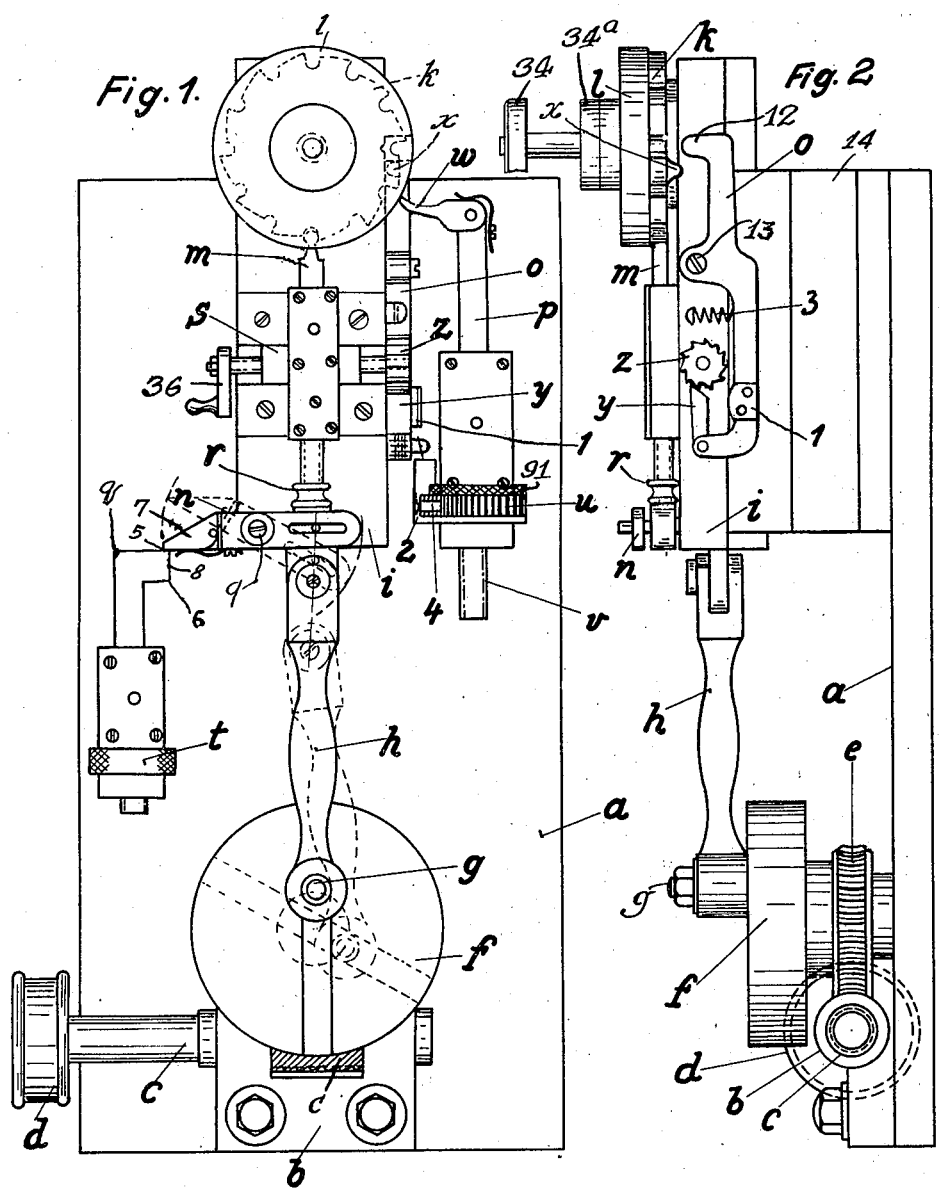
Inventor:  
Carl Otto Weber March 15, 1927.  C. O. WEBER  1,621,145
FEEDING DEVICE FOR GRINDING, MILLING, OR BORING MACHINES AND THE LIKE
Filed March 11, 1925    2 Sheets-Sheet 2
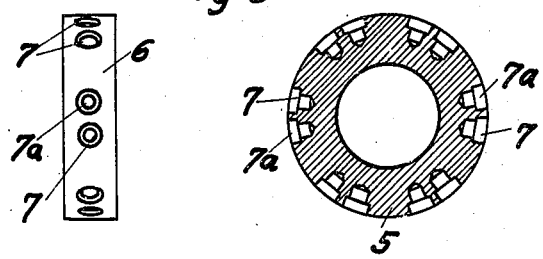
Fig. 3.
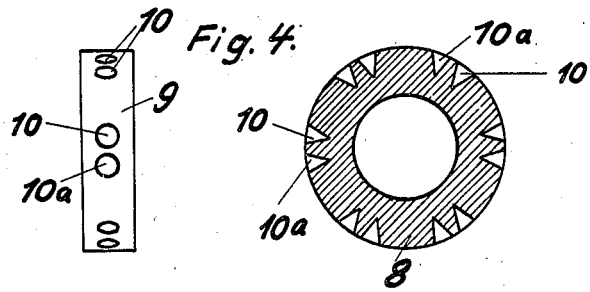
Fig. 4.
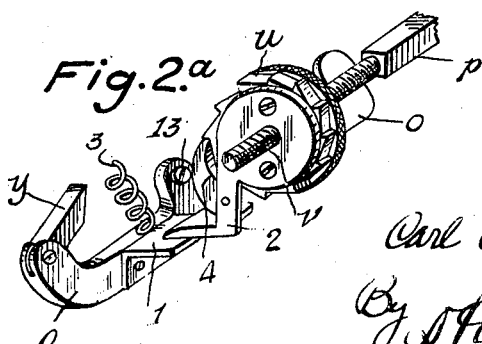
Fig. 2.ª
Inventor:
Carl Otto Weber Patented Mar. 15, 1927.

1,621,145

UNITED STATES PATENT OFFICE.

CARL OTTO WEBER, OF DRESDEN, GERMANY.

FEEDING DEVICE FOR GRINDING, MILLING, OR BORING MACHINES AND THE LIKE.

Application filed March 11, 1925, Serial No. 14,783, and in Germany October 26, 1922.

This invention relates to a novel feeding device for grinding machines and the like and has for its object to do away with the disadvantages which are connected with the ordinarily employed feeding by hand, in order to attain an exact working of the machine and especially an even feed corresponding to the thickness of the material which during working of the device is taken off from the surfaces of the tool under treatment. By the novel feeding device according to this invention the work piece (tool) in addition will be adjusted according to the desired working conditions in an entirely automatic way.

These features are attained according to this invention by a properly operated dividing plate, which is mounted upon a reciprocating slide, which latter is mounted upon the ground plate of the device below the face plate serving for the fastening of the work piece. This dividing plate is of a conformation corresponding to that of the work piece to be ground and therefore will serve as a model or specimen of the latter. In case the work piece is a milling cutter, which shall be repaired by grinding off the worn out surfaces of the teeth, the said dividing plate will be of the form of said milling cutter. According to this invention, now, the dividing plate, which is firmly connected with the tool to be ground, and which therefore serves as a controlling member for the process of grinding, is operated in such a manner that a reciprocating motion is given to the same by means of the slide upon which it is mounted. In addition to this reciprocating motion an intermittent rotary motion is given to the dividing plate after each reciprocative motion of the dividing plate. For imparting said intermittent rotary motion to the dividing plate there is employed a pair of pawls which are so operated during the reciprocating motion of the dividing plate that one of said pawls will serve for locking the dividing plate in position, and the other pawl will cause said intermittent rotary moton of the dividing plate. After the dividing plate has thus made a full rotary motion, during which the surfaces of each tooth of the milling cutter have been exposed to the action of a grinding wheel, a further mechanism will come into action, which will cause a proper feed of the dividing plate and therewith of the said surfaces of the milling cutter with respect to the grinding wheel.

In the accompanying drawings an example of the feeding device according to this invention is shown:

Figure 1 is a top view of the feeding device.

Fig. 2 is a side view thereof.

Fig. 2ª is a detail perspective view of lever o and its cooperating parts, and

Figs. 3 and 4 contain each a side view and a front view of two examples of work pieces, which may be worked upon by the feeding device according to this invention.

Upon the ground plate $a$ of the feeding device there is mounted a bearing block $b$, which carries a worm shaft $c$ provided with a pulley $d$ whereby operating power is supplied to the device. The worm on said worm shaft $c$ cooperates with a worm wheel $e$ mounted upon a shaft carrying a fly wheel $f$ provided with an adjustable crank pin $g$. The latter cooperates with the connecting rod $h$, whose upper end is pivoted to the slide $i$ which is mounted to permit reciprocating motion. The slide $i$ carries a dividing plate $k$ below a face plate $l$ for fixing the work piece. It also carries a locking pawl $m$ and has a release lever $n$ extending laterally from one side. A double lever $o$ is also mounted on slide $i$ and cooperates with the dividing plate $k$, and with a ratchet or feed wheel $z$ also mounted on the slide. The locking pawl $m$ is slidably mounted upon a slide $s$, which slide is slidable in transverse direction relatively to the slide $i$, said slide $s$ being adjustable by means of the feed wheel $z$ or by means of a crank lever or handle 36. The locking pawl $m$ is further equipped with a nut $r$ which bears on a block $r'$ on slide $i$ and through which pawl $m$ is slidable in order to enable an adjustment by hand in perpendicular direction to the direction of motion of the slide $s$. The double lever $o$ is fulcrumed at 13 on one side edge of the slide $i$ and is kept under the action of a spring 3. The one end of said double lever has an inturned finger 12 which cooperates with a tooth-like projection $x$ on the dividing plate $k$, while at the other end of the lever there is pivotally mounted a pawl $y$ engaging the ratchet wheel $z$. The end of the double lever $o$ which carries the pawl $y$ is provided with a laterally projecting bracket 1 which is adapted to cooperate with the lever 2 of a pawl 4. The pawl 4 engages a ratchet wheel $u$ cooperating with a sliding bar $p$ mounted at one side of the slide $i$ upon the ground plate $a$. The free end of the sliding bar $p$ is provided with a spring-actuated dog $w$, which cooperates with the dividing plate $k$. On the side of the slide $i$ opposite to the bar $p$ there is provided upon the ground plate $a$ a cam $q$ which may be adjusted by an adjusting nut $t$, said cam cooperating with the spring-actuated lever or pawl $n$, in order to temporarily release the locking pawl $m$ upon rotation of the crank wheel $f$. The lever $n$ has a spring pressed pivoted pawl or nose 7 for engagement with cam $q$.

In order to operate the novel feeding device according to this invention the dividing plate $k$ which corresponds to the desired work piece is fastened upon the slide $i$. Thereupon the locking pawl $m$ is adjusted relatively to plate $k$ by rotating the adjusting nut $r$ and the crank 36 serving for the reciprocating motion of the slide $s$. The sliding bar $p$ is adjusted by rotation of the feed wheel $u$, while the cam $q$ is adjusted by rotation of the nut $t$ which has threaded engagement therewith. The crank pin $g$ is of course also brought into the required position and fixed upon the wheel $f$. If now the worm-shaft $c$ be rotated, it will cause a rotation of the worm wheel $e$ and of the wheel $f$, the slide $i$ will make a reciprocating motion. The lever $n$ is actuated by the locking pawl $m$, as indicated in the drawing by the slot provided on said lever and the pin on the pawl $m$, and will thus cooperate with the cam $q$, whereby the locking pawl $m$ will be temporarily released and the dividing plate $k$ thus be fed forward by the dog $w$ of the sliding bar $p$ in the manner desired. By this also the face plate 1 together with the work piece will be rotated, so that another place of the latter will be exposed to the action of the working tools of the machine. As soon as the dividing plate $k$ has made a complete revolution, the projection $x$ on the same will abut against the double lever $o$, whereby the latter will be rotated around its pivot in opposition to the action of the spring 3. By this the pawl $y$ will impart a rotary motion to the ratchet wheel $z$, whereby again the slide $s$ will be displaced according to the direction of the rotation towards the one or the other side. Upon rotation of the lever $o$ the lateral projection 1 will engage the lever 2 of the locking pawl 4 thus adjusting the ratchet wheel $u$ and therewith the sliding bar $p$. A new course of work will now begin carrying pawl $w$.

The novel feeding device according to this invention may be employed especially in connection with grinding machines and the like and will under all conditions positively feed the work piece in the manner desired.

In Figs. 3 and 4 there are shown two examples of work pieces which may be produced by a drilling process by a machine provided with the feeding device according to this invention. The work piece shown in Fig. 3 is provided with sockets 7 and $7^a$ drilled into the circumference 6 of the ring 5, said sockets extending only into a part of the radial depth of the ring and having a greater diameter of the opening at the circumference of the disc, while according to the example shown in Fig. 4 sockets 10 and $10^a$ are provided at the circumference of the ring or disc, which taper toward their inner ends. The feeding of the device for this purpose is accomplished in such a manner, that first the sockets 7 or 10 and thereupon the sockets $7^a$ or $10^a$ are made.

The operation of the device according to this invention will be as follows:

During the downward stroke of the slide $i$ the dog 7 which is provided at the left hand end of the lever or pawl $n$ will abut against the fixed cam $q$, and thus cause said pawl $n$ to rotate around its pivot 9. This rotation of the pawl $n$ will continue as long as the extreme end 5 of the dog 7 is sliding upon the surface 8 of the cam $q$ and will have through the pin and slot connection between lever $n$ and pawl $m$ the effect that the locking pawl $m$ will be withdrawn from engagement with the dividing plate. At the same time the fixed pawl $p$, which at its upper end is provided with the dog $w$, will engage one of the teeth 11 of the dividing plate and thereby rotate the latter in counterclockwise direction. Upon further downward motion of the slide $i$ the point 5 of the dog 7 which is provided on the pawl $n$ will reach the lowermost point 6 of the surface 8 of the cam $q$, and on the upward stroke of slide $i$ will cause the locking pawl $m$ to swing into the full line position shown in Fig. 1 and again lock the dividing plate.

During the upward stroke of the slide $i$ the dog $w$ will rotate in clockwise direction and thus come out of engagement with the dividing plate $k$ as above described. At the same time the dog 7 on the pawl $n$ will slide over the surface 8 of the cam $q$, until it will again come into the position shown in full lines in Figs. 1 and 2 to produce fine grinding.

After the slide $i$ has made a number of reciprocating motions corresponding to the number of teeth 11 of the dividing plate and therewith caused a full rotation of the latter, the projection $x$ which is provided on the dividing plate will come in engagement with the end 12 of the lever $o$, which is fulcrumed at the point 13. By the actuation of the lever $o$ the locking pawl $m$ as well as the pawl *p* will be fed in correspondence with the thickness of the material which is taken off from the teeth of the milling cutter.

I claim:

1. A feeding device for grinding machines and the like, comprising a reciprocable slide, a face plate for fixing the work piece mounted on said slide, a dividing plate associated with said face plate, a pair of pawls adapted to intermittently feed and lock said dividing plate, and feeding means for feeding both of said pawls after a full revolution of said dividing plate.

2. A feeding device according to claim 1, having a locking pawl and an actuating pawl, both adapted to be released and actuated by reciprocating motion of the slide, a lever mechanism adapted to be operated by a full rotation of the dividing plate, and feeding means interposed between said lever mechanism and both of said pawls, said feeding means being adapted to feed said locking pawl in lateral and said actuating pawl in longitudinal direction.

3. A feeding device for grinding machines and the like comprising a reciprocable slide, means for fixing the work piece mounted on said slide, a dividing plate associated with said piece, a pair of pawls adapted to intermittently feed and lock said dividing plate, said pawls being released and actuated by the reciprocatory motion of the slide, lever mechanism operable by a full rotation of the dividing plate, feeding means interposed between said lever mechanism and said pawls, and means for adjusting the locking pawl in a direction perpendicular to the reciprocating motion of the slide.

4. A feeding device for grinding machines and the like comprising a reciprocal slide, means for fixing the work piece mounted on said slide, a dividing plate associated with said piece, a pair of pawls angularly movable with respect to each other adapted to intermittently feed and lock said dividing plate, said pawls being released and actuated by the reciprocatory motion of the slide, lever mechanism operable by a full rotation of the dividing plate, feeding means interposed between said lever mechanism and said pawl, and an adjustable cam for controlling the withdrawal and actuation of the locking pawl.

5. A feeding device for grinding machines and the like comprising a reciprocal slide, means for fixing the work piece mounted on said slide, a dividing plate associated with said piece, a pair of pawls adapted to intermittently feed and lock said dividing plate, said pawls being released and actuated by the reciprocatory motion of the slide and movable in different directions one from the other, lever mechanism operable by a full rotation of the dividing plate, feeding means interposed between said lever mechanism and said pawl, and an adjustable actuating pawl.

6. A feeding device for grinding machines and the like comprising a reciprocable slide, a dividing plate mounted on said slide, means for mounting the work piece in connection with said plate, a locking pawl for said dividing plate mounted to move in planes at right angles to each other, cam controlled means for projecting and withdrawing said locking pawl, a feeding pawl for said plate angularly movable with respect to said locking pawl and operable on the withdrawal of the locking pawl to rotate said plate a predetermined distance.

7. A feeding device for grinding machines and the like comprising a reciprocable slide, a dividing plate mounted on said slide, means for mounting the work piece in connection with said plate, a locking pawl for said dividing plate mounted to move in planes at right angles to each other, cam controlled means for projecting and withdrawing said locking pawl, a feeding pawl for said plate angularly movable with respect to said locking pawl and operable on the withdrawal of the locking pawl to rotate said plate a predetermined distance, and means for feeding said pawl after a full revolution of said dividing plate.

In testimony whereof I have affixed my signature.

CARL OTTO WEBER.